July 14, 1953 W. HATTON ET AL 2,645,420

CALCULATOR EQUIPMENT WORKING WITH TELEPRINTER

Filed July 1, 1947 3 Sheets-Sheet 1

Inventors
WILLIAM HATTON
LESLIE B. HAIGH
LADISLAS KOZMA

By Robert Harding Jr.
Attorney

Inventors
WILLIAM HATTON
LESLIE B. HAIGH
LADISLAS KOZMA

By Robert Harding Jr
Attorney

CALCULATOR EQUIPMENT WORKING WITH TELEPRINTER

Filed July 1, 1947 3 Sheets-Sheet 3

Inventors
WILLIAM HATTON
LESLIE B. HAIGH
LADISLAS KOZMA

By Robert Harding Jr.
Attorney

Patented July 14, 1953 2,645,420

UNITED STATES PATENT OFFICE 2,645,420

CALCULATOR EQUIPMENT WORKING WITH TELEPRINTER

William Hatton, Great Neck, N. Y., Leslie Baines Haigh, West Orange, N. J., and Ladislas Kozma, Budapest, Hungary, assignors to International Standard Electric Corporation, New York, N. Y., a corporation of Delaware Application July 1, 1947, Serial No. 758,274
In Great Britain February 16, 1940

Section 1, Public Law 690, August 8, 1946
Patent expires February 16, 1960

14 Claims. (Cl. 235—61)

This invention relates to electric calculator equipment, and to circuit arrangements for an accounting system using such equipment.

According to the main feature of the invention we provide electric calculator equipment adapted to receive over a two-wire line signals representing a problem to be solved and automatically to transmit over the same or another two-wire line signals representing the solution to said problem.

In the preferred embodiment, which will be described by way of example, signals are transmitted to said equipment in the well-known teleprinter 7-unit code.

The said two-wire line may be permanently connected to a teleprinter or the circuit arrangement may be adapted to be a called station in a teleprinter exchange system so that the electric calculator equipment is accessible to any one of a plurality of teleprinter stations at will.

These arrangements enable the construction of an accounting system in which items to be recorded in an individual account are transmitted in teleprinter code to a storing means individual to the particular account. At predetermined times, as for example, at the end of the day each of these storing means is connected in turn to an electric calculator.

Figure 1:
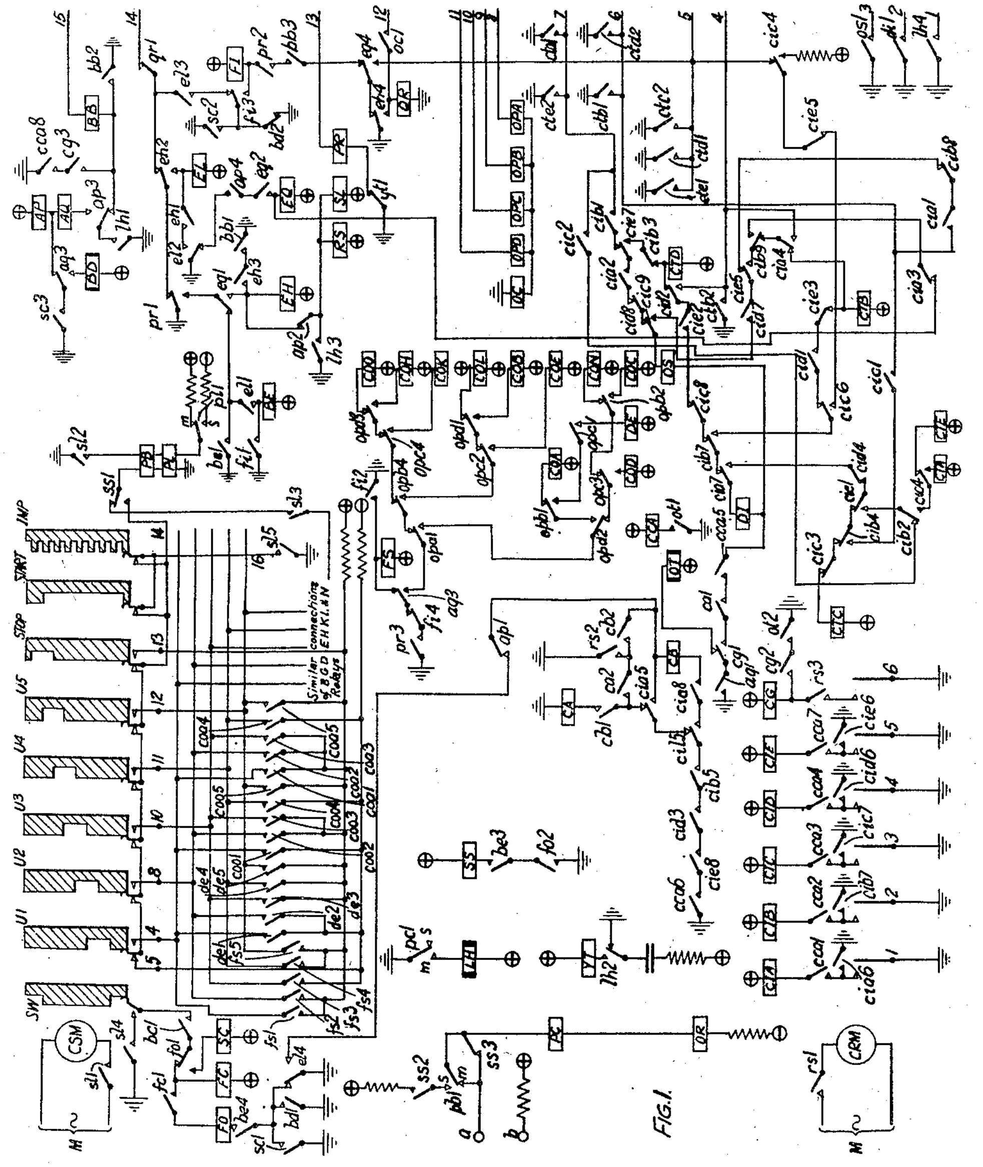
Figure 2:
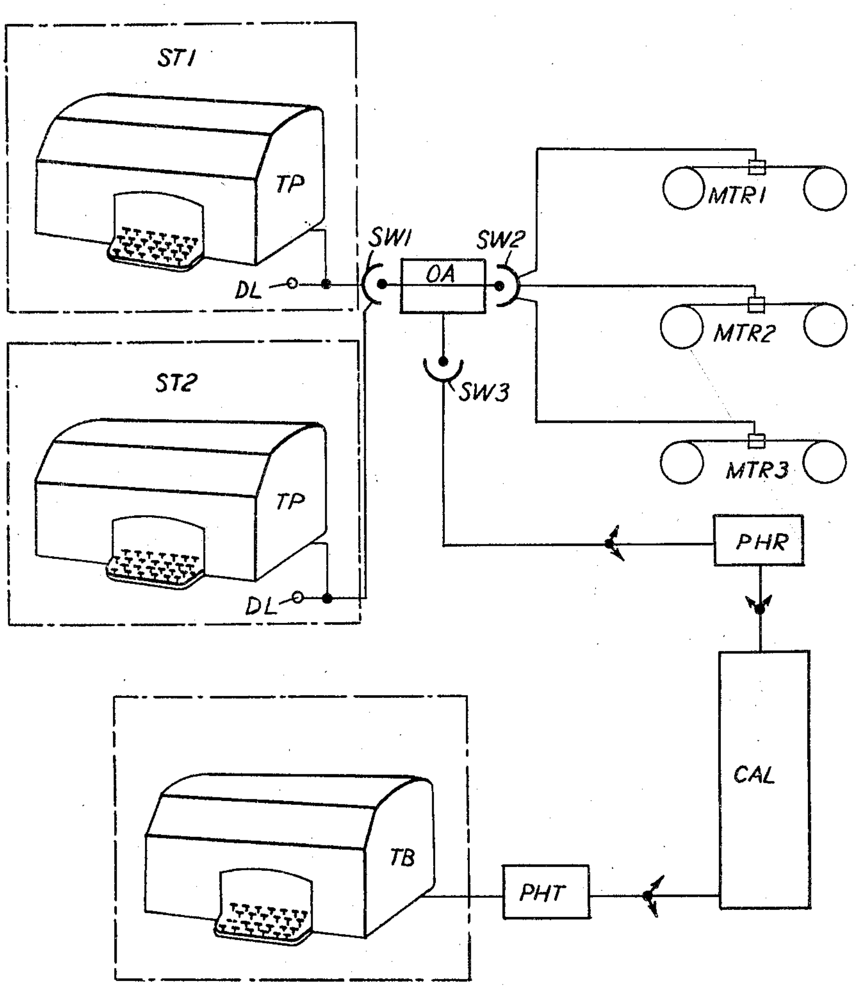
Figure 3:
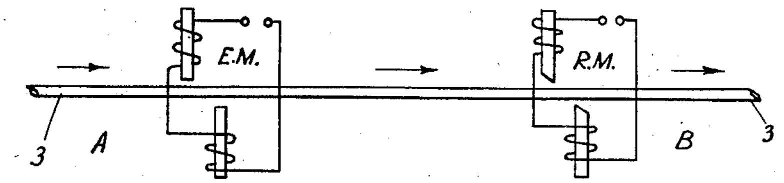
Figure 4:
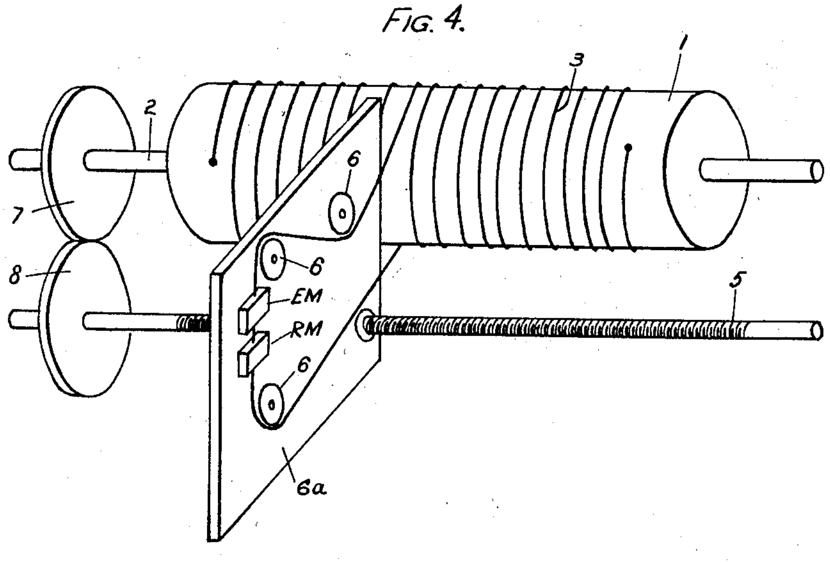

The invention will be better understood from the following description taken in conjunction with the accompanying drawings in which:

Fig. 1 shows a circuit arrangement connected on the right to an electric calculator equipment of the kind described in Figs. 10 and 11 of U. S. Patent No. 2,344,885, granted to Ladislas Kozma and Jakob Kruithof, on March 21, 1944, and on the left to a teleprinter sub-station;

Fig. 2 shows schematically a circuit arrangement for an accounting system; whilst Fig. 3 shows schematically an arrangement for recording printing telegraph signals on a magnetic tape; and Fig. 4 shows constructional details of such an arrangement.

Referring to the drawings and first to Fig. 1, this shows a circuit arrangement connected on the left to a two-wire line *ab* leading directly to a teleprinter. The teleprinter comprises a switch for completing a loop circuit from the line *ab* through the transmitting contacts in marking position and the operating magnet of the teleprinter in series. This switch in well-known manner also connects the teleprinter motor to a mains supply.

When the operator desires to connect the teleprinter to a calculator, this switch is operated and results in the energisation of relay PC in the following circuit: Positive battery, resistance, line *b*, teleprinter loop, line *a*, back contacts *ss*3, winding of PC, winding of OR, resistance negative battery. PC is a polarised relay, the contacts *pc*1 of which are normally spring biassed to spacing position *s*. OR is the receiving magnet of a start-stop receiver, which will be fully described below. OR energises and PC moves its contacts *pc*1 into marking position as a result of the closure of the above mentioned circuit.

Relay LH then energises in an obvious circuit and contacts *lh*3 front energise relays SL and RS and over back contacts *ap*2 relay EH.

Relay SL at contacts *sl*1 front connects the motor CSM of a code sender to the mains M and relay RS at contacts *rs*1 connects the motor CRM of the above mentioned start-stop receiver to the mains M.

At front contacts *sl*3 a circuit is completed for polarised relays PB and PL from positive battery resistance, contacts *sl*3 front, *ss*1 back, left hand windings of PB and PL, ground. The direction of current flow in these windings is such as to cause these relays to move their contacts *pl*1 and *pb*1 into marking positions *m*, and and holding circuit is closed from + telegraph battery, resistance, contacts *pl*1 in marking position, right hand windings of PL and PB, *sl*2 front, ground. The current in this last mentioned circuit is small and its influence is dominated by that of the current in the left hand windings, it will, therefore, hold these relay contacts in whatever position they have been placed, until they are reversed by current in the operating windings.

The start-stop receiver above mentioned consists of any well-known form of motor driven receiver which remains stationary whilst the operating magnet OR is energised. When this magnet is de-energised by the starting impulse of a teleprinter code combination, a shaft is clutched to the driving shaft of the motor CRM and the position of the armature of magnet OR is scrutinised at the middle of each of five twenty milli-second intervals. Contacts 1 to 5 are closed or remain open according as the magnet OR is de-energised or energised, so that the teleprinter combination signal is reproduced by the closure of contacts 1 to 5. Contact 6 then closes invariably for the stop signal. If the armature of magnet OR remains attracted when the shaft reaches its normal position again, the shaft stops and the contacts remain as set until another start signal arrives on magnet OR.

As an example of a code receiving arrangement that may be employed, the receiver described in British patent specification No. 524,917, may be referred to. In this last mentioned arrangement a lamp is lit each time the receiving magnet is de-energised and five photo-electric devices are influenced by light from the lamp during a revolution, so as to energise or not energise five relays. These relays close locking circuits for themselves and thus contacts 1—5 may be contacts of these relays.

When the circuit of motor CRM is opened the shaft may have been left in any position. When the motor CRM is re-started the shaft will complete its cycle and come to rest with contact 6 closed. CG is accordingly operated over *rs*3 front, contact 6 ground. At contacts *lh*2 front, a condenser which is already charged is caused to discharge through relay YT.

This relay opens its contacts *yt*1 for a sufficient interval to remove ground from relay PR and terminal 13 leading to the calculator. The interval of time during which this ground is removed is sufficient to allow the motors CSM and CRM to attain their normal speeds.

The calculator may be of the kind described in Figs. 9, 10, and 11 of U. S. Patent No. 2,344,885, referred to above, but modified so that an additional connecting wire 15 is provided to which battery is normally connected in the calculator, and by arrangements for removing and replacing this battery during the operation of the calculator as will be apparent from the description which follows. This battery operates relay BB over *ap*3 back, *lh*1 front, ground. The operated condition of BB indicates that the calculator is not yet ready to receive a problem.

Relay EL operates over *eh*2 front, *pr*1 back to ground and locks over *eh*1 front, *el*2 front, ground.

Ground normally is connected over *pr*1 back, *eh*2 back, *qr*1 back to wire 14 leading to the calculator. This is removed when EH operates but replaced when EL operates over *bd*2 back, *fi*3 back, *el*3 front, *qr*1 back.

Relay CB operates over *ap*1 back, *el*4 front, ground. Relay CB normally has the function of storing the "figure shift" signal as received by the code receiver from the teleprinter. It is operated at this stage because the "figure shift" signal is about to be transmitted to the teleprinter and it is advisable that the condition of the circuit shown in the figure of the teleprinter should correspond.

The code sender used is of the kind described in British patent specification No. 520,548, in which a combination of potentials representing a character to be transmitted is connected to contacts operated by cams. In the application above referred to these potentials were connected from contacts of a single motion switch. In the present instance the potentials are connected by relay contacts as will be apparent. The cam marked IMP opens and closes its contact 9 times for each cycle of rotation of the cams shown or once every 20 milliseconds. The contacts are shown in the position they assume at the moment the code sender is about to transmit a code combination. Negative potential is permanently connected to terminal 5 and positive potential to terminal 13. The cams U1, U2, U3, U4, U5 and STOP are so cut as to connect terminals 5, 4, 8, 10, 11, 12 and 13 in turn at approximately 20 millisecond intervals to terminal 14.

*Start signal sent to calculator*

The transmission of the figure shift signal by this code sender does not take place until the calculator is seized for operation.

As described with reference to U. S. Patent No. 2,344,885, above referred to, the calculator is seized by connecting ground to wire 1 leading to the calculator. (In the present embodiment this ground is connected over front contacts *lh*4.) The calculator then transmits to the operator a full stop three times in succession by connecting battery to all four wires 8–11. In the present embodiment this operates relays OPA, OPB, OPC, OPD and also relay OC.

Ground over *eh*4 front, *oc*1 front is connected to wire 12 leading to the calculator. This indicates that the code has been received whereupon the calculator applies battery to wire 13 to initiate printing of the code signal. This battery operates relay PR over *yt*1 back.

Relay PR in operating operates BE over *el*1 front, *eq*1 back, *pr*1 front, ground.

When the cam SW of the code sender closes its contact FC operates: battery, winding of FC, back contacts *fo*1, front contacts *be*2, contacts operated by SW, front contacts *sl*4, ground. Relay FC locks over front contacts *fc*1, winding of FO, front contacts *be*4, back contacts *bd*1 ground, but FO does not operate because it is short circuited. FO remains short circuited until the SW contacts open again, when it operates, relay SS then operates over *be*3 front, *fo*2 front, ground.

*Transmission of figure shift signal to the teleprinter*

When PR operated, it operates relay FS over *aq*3 back, *fi*4 back, *pr*3 front, ground. Relay FS serves to connect to the terminals 4, 8, 10, 11, 12 of the code sender the potentials necessary for transmission of the figure shift signal in teleprinter code.

Relay SS disconnects the operating windings of PB and PL from positive battery and connects them to terminal 14 of the code sender. With the contacts operated by the cams of the code sender in the position shown, i. e. at the commencement of a cycle of operations this terminal is connected over contacts operated by the start cam, terminal 16 of the code sender, front contacts *sl*5, ground. At front contacts *ss*3, the short circuit around the contacts *pb*1 in marking position is removed and ground is connected over these contacts to wire *a* leading to the teleprinter.

When the contacts operated by the start cam open, terminal 14 is still grounded over contacts operated by the interrupter cam IMP, but when these latter contacts open, terminal 14 is connected over contacts operated by the stop cam, and by cams U5, U4, U3, U2, U1 to negative telegraph battery. PB and PL accordingly reverse their contacts to spacing position. Contacts *pb*1 open the loop to the teleprinter, thus sending the spacing impulse, whilst they also connect positive battery over a resistance and front contacts *ss*2 to relay PC and magnet OR to hold these operated. When contacts operated by IMP again close, relays PB and PL are again short circuited but they remain held in spacing position by the current in their holding windings over contacts *pl*1.

Whilst the contacts operated by IMP are still closed, contacts operated by U1 reverse. Terminal 14 is now connected to terminal 4 and when contacts operated by IMP open, the potential applied to this terminal over front contacts of FS is impressed upon relays PB and PL. Transmission of the code combination representing the figure shift signal is transmitted in a manner which will be clear from the description of the code sender given in British patent specification No. 520,548 above referred to. The figure shift signal consists of mark, space, mark, mark, mark. Whilst the contact of IMP is again closed after transmission of the last mark, the contacts controlled by the Stop cam open to connect positive potential on terminal 13 and so when the IMP contacts open, to transmit a stop impulse. After these latter contacts have again closed, the contacts of the start cam reclose and short circuit PB and PL until the end of the cycle.

*Transmission of full stop signal to the teleprinter*

When the contacts controlled by cam SW closed during the above cycle of operations, relay SC energises over front contacts *fo1*, front contacts *bc1*, contacts of cam SW, front contacts *sl4*, ground. Relay AP operates over back contacts *aq3*, front contacts *sc3*, ground. Relays AP locks over winding of AQ, front contacts *ap3*, front contacts *lh1*, ground. Relay AQ remains short circuited until contacts controlled by cam SW open again and SC de-energises, whereupon AQ operates.

Relay AQ releases FS over back contact *ag3* and operates the full-stop relay DE over front contacts *opa1*, *opd2*, *opb1*, *opc1*.

Relay DE connects positive potential to terminals 10, 11 and 12 of the code sender and negative potential to terminals 4 and 8.

During the next cycle of the shaft of the code sender therefore, relays PB and PL are connected in turn to the appropriate potentials for transmitting to the teleprinter the combination representing the "full stop."

During this cycle, SC operated in the same manner as before and this time operates BD over front contacts *aq3*. When SC operates ground is applied over front contacts *sc2*, back contacts *fl3*, front contacts *el3*, back contacts *qr1* to wire 14 leading to the calculator. The connection of ground over these contacts is in parallel to the ground already existent over back contacts *bd2*, which latter is, however, removed when BD operates. The ground over *sc2* front is, however, applied before that over *bd2* back is removed. Towards the end of the cycle, when contacts of cam SW open, SC releases and removes ground from wire 14, this acting as a signal to the calculator that the full stop has been printed. The release of SC is followed after an interval by the release of BD and the ground on wire 14 is restored. During the interval before the release of BD, relays FC and FO release. The release of FO releases SS which reconnects PB and PL to positive battery and short circuits the marking contact *m* of contacts *pb1*.

When the calculator receives the signal of removal of ground from wire 14, the battery is removed from wires 8—11 and wire 13. Relays OPA, OPB, OPC, OPD, OC and PR release and OC removes ground from wire 12. PR releases DE.

When the calculator receives the signal of replacement of ground on wire 14, this indicates that another signal may be sent and accordingly a second full stop code is transmitted by the calculator again operating relays OPA—OPD and OC.

PR is reoperated as before. As AQ is operated relay DE operates again and the code sender transmits a second full stop. The sequence of operation and release of SC and BD takes place as before and the removal of ground from wire 14.

The calculator again sends a full-stop code which is transmitted as above described. When the relays OPA—OPD, OC, PR and DE have again released the calculator is ready to accept a problem for calculation and indicates the fact by removing battery from wire 15. Relay BB releases followed by EH, EL and BE. When battery is reconnected to wire 15, there is no circuit for relay BB which does not re-operate at this stage. Ground over *pr1* back, *eh2* back, *qr1* back is reconnected to wire 14 before contacts *el3* open to remove the ground over *bd2* back from this wire.

*Operator transmits problem to the calculator*

The printing of three full stops on the teleprinter is a signal to the operator that he may submit a problem to the calculator. He may do so immediately or he may first transmit a message, of no interest to the calculator, for his local record. All signals transmitted from the teleprinter to the circuits shown are received by the code receiver but until a particular signal is received these are not passed onto the calculator. In the embodiment described a special signal combination not used in the ordinary teleprinter code is allotted to this particular "calculate" signal, viz. the combination in the "figures" case corresponding to letter "G." The teleprinter is already in the "figures" case, due to the signal sent by the code sender and the code receiver is also in this case, due to the energization of relay CB.

The operator may therefore transmit the "calculate" signal combination immediately. Signals sent from the teleprinter operate the relay OR (and also relay PC, which, however, performs no function at this stage). On receipt of the starting impulse the shaft of the receiver rotates and contacts 1 to 6 first open. The opening of contact 6 releases CG. Relay OT then operates over *cg1* back, *aq1* front. Relay CCA then operates to ground on *ot1* front.

The calculate signal combination results in the closure of contacts 2, 4 and 5 and when the shaft comes to rest these contacts remain closed and contacts 6 close again.

Contact 2 operates relay CIB, which locks over *cca2* front, *cib7* front, ground.

Contacts 4 and 5 operate relays CID and etc. CIE. It is to be understood that helping relays may be provided if necessary. These relays cause the operation of relay CA over *cb1* front, *cia5* back, *cid5* back, *cib5* front, *cid3* front, *cie8* front, *cca6* front, ground. Relay CA operates and locks over *cb1* front, *ca2* front, *rs2* front, ground.

Contact 6 of the code receiver reoperates CG which locks over *cg2* front, *ot2* front, ground. CG breaks the circuit of OT which releases slowly. The locking circuit of CG ensures that CG remains operated until OT releases which is sufficient for the transfer of a code to the calculator. BB now operates: ground, *cca8* front, *cg3*, front, winding of BB wire 15 to the calculator and battery therein. BB locks to ground over front contacts *bb2*.

OT in releasing releases CCA and this relay releases the CI relays. The circuit is now in the required condition to accept signals from the teleprinter and pass them on to the calculator.

The receipt of a signal combination results first in the opening of contact 6, followed by the release of CG and the operation of OT and CCA, then the closure of contact 6 and a certain combination of the contacts 1—5. A combination of relays CIA—CIE is energised and this results in the energisation of certain of the helping relays CTA—CTE and in the grounding of a combination of the wires 2—7 leading to the calculator to transmit the signal thereto.

In the case of a combination representing a digit, the relay DI is energised, in the case of a combination representing an operation sign, decimal point, the "equals" sign, or the cancel signal, the relay OS is energised.

In the case of combinations representing any other signal in the "figures" or upper case, neither of the relays DI nor OS is energised and the connections to the wires 2—7 leading to the calculator are such that none of these wires is grounded.

The following table shows the relays which will be operated during these processes and the resulting signals to the calculator.

*cg*1 front, *aq*1 front, ground. Relays CTD and DI operate. Relay CTD at front contacts *ctd*1 and *ctd*2 connects ground to wires 5 and 6 leading to the calculator and DI at front contacts *di*1 connects ground to wire 2, thus transferring digit 5 to the calculator. This condition persists until relay OT has released.

As described in U. S. Patent No. 2,344,885 the calculator, upon receipt of a digit or operation sign over the wires 2—7, immediately reproduces it back over the wires 8—11, thus operating relay OC and a combination of the relays OPA—OPD. This function of the calculator is needed when it is connected to a station at which there is a printer not controlled from the keys which send in the digits and operation signs to the calculator. It is not needed when the calculator is connected to a teleprinter since all characters transmitted from the teleprinter are printed locally. The circuits shown are therefore arranged so as to absorb these signals.

As soon as OC operates, ground over QR and *oc*1 front is connected to wire 12 to acknowledge to the calculator receipt of the signal. QR operates in this circuit and at contacts *qr*1 removes ground from wire 14 so that the calculator is

TABLE 1

| Figures or signs sent by teleprinter | Code receiver contacts closed | | | | | Code Relays operated | Helping relay operated | Digit or sign relay operated | Calculator input wires grounded | | | | | |
|---|---|---|---|---|---|---|---|---|---|---|---|---|---|---|
| | 1 | 2 | 3 | 4 | 5 | CIA—E | | | 2 | 3 | 4 | 5 | 6 | 7 |
| 0 | ---- | x | x | ---- | x | CIA, CIB, CIE | CTA | DI | x | ---- | ---- | ---- | ---- | ---- |
| 1 | x | x | x | ---- | x | CIA, CIB, CIC, CIE | CTA | DI | x | ---- | x | ---- | ---- | x |
| 2 | x | x | ---- | ---- | x | CIA, CIB, CIE | CTE | DI | x | ---- | ---- | x | ---- | x |
| 3 | x | ---- | ---- | ---- | ---- | CIA | CTC | DI | x | ---- | x | x | ---- | ---- |
| 4 | ---- | x | ---- | x | ---- | CIB, CID | CTB | DI | x | ---- | x | ---- | x | ---- |
| 5 | ---- | ---- | ---- | ---- | x | CIE | CTD | DI | x | ---- | ---- | x | x | ---- |
| 6 | x | ---- | x | ---- | x | CIA, CIC, CIE | ---- | DI | x | ---- | ---- | ---- | ---- | x |
| 7 | x | x | x | ---- | ---- | CIA, CIB, CIC | ---- | DI | x | ---- | ---- | ---- | x | ---- |
| 8 | ---- | x | x | ---- | ---- | CIB, CIC | ---- | DI | x | ---- | ---- | x | ---- | ---- |
| 9 | ---- | ---- | ---- | x | x | CID, CIE | ---- | DI | x | ---- | ---- | ---- | ---- | ---- |
| + | x | ---- | ---- | ---- | x | CIA, CIE | CTD | OS | ---- | x | ---- | x | x | ---- |
| − | x | x | ---- | ---- | ---- | CIA, CIB | ---- | OS | ---- | x | ---- | ---- | ---- | x |
| x | x | ---- | x | x | ---- | CIA, CIC, CID | ---- | OS | ---- | x | ---- | ---- | x | ---- |
| = | ---- | x | x | x | x | CIB, CIC, CID, CIE | EQ | OS | ---- | x | ---- | x | ---- | ---- |
| Decimal point | ---- | ---- | x | x | x | CIC, CID, CIE | CTB | OS | ---- | x | x | ---- | x | ---- |
| Cancel | x | ---- | x | x | x | CIA, CIC, CID, CIE | ---- | OS | ---- | x | x | ---- | ---- | ---- |

It will be observed that all possible circuits for operating OS and DI and for grounding either directly or indirectly wires 2 to 7 leading to the calculator pass over front contacts *ca*1 so that unless relay CA has been previously operated, i. e. unless the "calculate" signal has been sent from the teleprinter, no code signal whatever can be transferred to the calculator.

It will also be noted that even after the "calculate" signal has been sent from the teleprinter only the sixteen signals listed in the table above will be passed to the calculator, so that the operator may intersperse the problem with other signs in the upper case without disturbing the operation of the calculator. The sign for multiplication is not present in the normal teleprinter code, since if it be desired to use it the latter X may be typed. In the present embodiment, the normally unallocated combination in the "figures" case corresponding to F in the letters case has been chosen for this sign.

As an example of the circuits set out in the table, the receipt of digit 5 may be considered. On energisation of relays CIE and CG the following circuit may be traced: battery, winding of CTD, *cid*2 back, *cie*2 front, *cic*8 back, *cib*7 back, *cia*7 back, winding of DI, *cca*5 front, *ca*1 front, prevented from applying battery to wire 13. The calculator removes battery from wire 15 releasing relay BB, and removes battery from wires 8—11, releasing OC and OPA—OPD. OC disconnects QR from wire 12 and so releases that relay. QR reconnects ground to terminal 14 whereupon the calculator connects battery to wire 15.

In the case of digit 0 there is no operation of any of the relays OPA—OPD. The calculator applies battery to wire 13 operating PR which removes ground from wire 14. PR is then released and reconnects the ground.

*Blocking of teleprinter during calculation*

After receiving an operation sign and also at some other moments, the calculator requires a certain time before it is ready to accept further digits. To restrain the operator from further transmission during this period, a succession of "figure shift" combinations is transmitted to the teleprinter.

When an operation sign is sent to the calculator it is sent back therefrom over wires 8—11 and the energisation of OC connects QR to wire 12. Contacts *qr*1 remove ground from wire 14 as described above, but this is ignored by the calculator, and thus the latter does not remove battery from wire 15 whereby BB is held. Battery potential is placed on wire 13 operating PR.

Relay FI then operates from battery, winding of FI, *pr2* front, *bb3* front, *eq4* back, *eh4* back, ground. FI locks over *fi 3* front, *bd2* back, ground FI operates BE and FS in obvious circuits.

As previously described, at the beginning of a cycle of the code sender FO operates and the figure shift combination is transmitted to the teleprinter and continues to be transmitted as many times as necessary. It should be noted that FC and FO do not release at the end of each cycle, because they are held over back contacts *el4*.

As soon as the calculator is ready to proceed

When PR releases, EL operates over *eh2* front, *pr1* back, ground and locks over *eh1* front, *el2* front, to ground and releases EQ. Ground is again connected over *bd2* back, *fi3* back, *el3* front, *qr1* back, to wire 14.

The equals code has thus also been absorbed.

*Transmission of solution from calculator to teleprinter*

The calculator now produces the solution a digit at a time, with the decimal point in its correct place and follows it by 3 full stops indicating its readiness to accept another problem.

The following table indicates the manner in which the digits are sent by the calculator and their translation into teleprinter code.

TABLE 2

| Digit or sign received | Calculator output wires connected to battery | | | | Output relays operated | Code changing relay operated | Teleprinter code elements transmitted s=− m=+ | | | | |
|---|---|---|---|---|---|---|---|---|---|---|---|
| | 8 | 9 | 10 | 11 | | | 1 | 2 | 3 | 4 | 5 |
| 0 | | | | | None | COO | s | m | m | s | m |
| 1 | x | | | x | OPA, OPD | COA | m | m | m | s | m |
| 2 | | x | | | OPB, OPD | COB | m | m | s | s | m |
| 3 | x | x | | | OPA, OPB | COC | m | s | s | s | s |
| 4 | x | | x | | OPA, OPC | COD | s | m | s | m | s |
| 5 | | x | x | | OPB, OPC | COE | s | s | s | s | m |
| 6 | | | | x | OPD | COH | m | s | m | s | m |
| 7 | | | x | | OPC | COK | m | m | m | s | s |
| 8 | | x | | | OPB | COL | s | m | m | s | s |
| 9 | x | | | | OPA | CON | s | s | s | m | m |
| Decimal point or full stop | x | x | x | x | OPA, OPB, OPC, OPD | DE | s | s | m | m | m |
| Figure shift | | | | | | FS | m | m | s | m | m |

it opens wire 15 momentarily, releasing BB and also opens wires 8 to 11 and 13 releasing OPA—OPD, OC, QR and PR. At the end of the next cycle of the code sender when the contact of cam SW opens, SC releases followed in turn by FI, FS, BE, FC and FO and the transmission of the figure shift ceases.

Another digit can then be submitted by the operator.

*Operator requests solution*

When the operator has submitted the whole of his problem, he requests the solution by transmitting the equals combination. The code receiver operates the relays set out in Table 1 above and a momentary circuit may be traced for EQ and OS; Ground, *aq1* front, *cg1* front, *ca1* front, *cca5* front, winding of OS, *cic9* front, *cid7* front, *cie5* front, *cib9* front, *cia3* back, EQ battery. EQ operates and locks over *eq2* front, *ap6* front, *el2* back, ground.

Front contacts *eq4* connect ground on back contacts *eh4* to wire 5. OS connects ground to wire 3. BB operates and locks as usual. The equals sign has thus been transferred to the calculator.

The calculator sends back the code for this sign over wires 8—11 by operating the appropriate relays OPA—OPD and also relay OC. Relay OC at contacts *oc1* connects ground from front contacts *eq3* to wire 12. The calculator connects battery to wire 13 to operate relay PR.

Relay PR connects ground over *pr1* front, *eq1* front to EH and battery. EH operates and locks over *eh3* front to *bb1* front and ground. The opening of contacts *pr1* removes ground from terminal 14, whereupon the calculator releases the relays, OC, OPA—OPD, but maintains battery on the wire 15 to hold relay BB.

For each digit in succession OC operates in series with the appropriate combination of OPA—OPD. Contacts *oc1* connect ground to wire 12. The calculator operates PR. PR operates one or other of the code changing relays listed above and also BE which locks.

FC operates when the contact of SW closes and FO operates when it opens again. FO operates relay SS and the code changing relay connects the appropriate potentials to the cams of the code sender to transmit the appropriate teleprinter combination to the teleprinter. The contacts by which all the code changing relays connect potentials to the code sender are not shown in full on the drawing to avoid undue complication.

When SW closes, SC and BD operate and release in that order at the end of the cycle when SW opens again. During the release of BD ground is removed from terminal 14 and then replaced and FC and FO release. FO releases SS. The calculator releases the relays OC, OPA—OPD and PR. OC removes ground from terminal 12, PR releases the operated code combination relay.

When the whole of the solution and three full stops have been sent, the calculator opens wire 15, releasing BB, EH, EL and BE in turn. The circuit is now precisely in the same condition as it was just before the problem was submitted and is ready to receive a further communication from the operator.

As pointed out above the code receiver will not respond to any signals unless the "calculate" signal has been received. If the operator has typed a message containing lower case characters and has thus depressed the "letter shift" key, the "letter shift" signal conditions the circuit to reject all combinations and not to transfer any to the calculator. When this signal is received, contact 6 is first opened, releasing CG, and operating OT and CCA as before. The "letter shift" signal then results in re-closure of contact 6 and closure of contacts 1, 2, 3, 4 and 5. This time therefore relays CIA—CIE operate: ground over *cca6* front, *cie8* front, *cid3* front, *cib5* front, *cid5* front, *cia8* front, short-circuits the battery connected to relay CB. CB accordingly releases. CG operates again to contact 6 and releases OT slowly. OT releases CCA, and the latter releases the CIA-CIE relays. CG operates BB which locks. The circuit is now in condition to reject all combinations received, except the figures shift signal.

In order that the circuit may be conditioned to pass on signals to the calculator, the "figures" shift signal, followed by the "calculate" signal must be sent (though not necessarily consecutively—any other combination except "letter shift" may be interposed).

When the "figure shift" signal is received contacts 1, 2, 4, 5 and 6 of the code receiver are closed and a circuit is closed for relay CB from ground, *cca6* front, *cie8* front, *cib5* front, *cic5* back, *cia5* front, winding of CB, battery. Relay CB operates and locks over *cb2* front to *rs2* front and ground. CG releases OT and CCA and the CIA—CIE relays release again. BB operates and locks as before.

With relay CB operated the receipt of the "calculate" signal results in the operation and locking of CA as previously described.

*Release of the circuit*

When the operator opens the loop to the teleprinter relay PC moves its armature on to its spacing contacts *s*. After a short interval LH releases and opens the holding circuit of the calculator (over wire 1) which releases. LH releases RS and SL. RS releases the code receiver and stops the motor, SL on releasing stops the code sender motor. The polarised relays PB and PL are deprived of current and all remaining non-polarised relays release.

The circuit is now again in idle condition.

It is clear from the above description that many modifications may readily be made in the circuit shown in Fig. 1 to adapt it to different requirements. For example, the circuit may, instead of being connected directly to a teleprinter, be adapted to be a called station on a teleprinter exchange system. For this purpose it is only necessary to provide a modification in the means by which the circuit is taken into use together with means for marking the circuit busy when it has been taken into use. In this way a calculator service may be provided for a plurality of operators, none of whom requires a full time use of calculator equipment.

It is clear also that the circuit may be modified so that the digits of the problem as sent back by the calculator, instead of being absorbed as described above are retransmitted to the operator.

Although particular forms of code senders and code receivers have been described, the invention is independent of the particular forms of such apparatus. Thus the circuit could readily be adapted to interwork with a printing telegraph transmitter by which the five signals of the printer code, instead of being spaced in time, are sent simultaneously by means of different frequencies, for example, in the voice frequency range. The receiving equipment for such signals consists in known manner of five selective circuits for selection of the five frequencies and corresponding relays for closing contacts corresponding to the contacts 1—5 of the code receiver of Fig. 1. In such case a sixth frequency may be transmitted invariably to close contact 6 of the code receiver, either simultaneously with the contacts 1 to 5 or after an interval. Similarly the code sender used may be adapted to send the signals of the printer code simultaneously by means of different frequencies to work with a receiver employing five translating magnets, a sixth frequency being sent invariably to operate a printer magnet.

Moreover, the circuit shown in Fig. 1 may be adapted to contain a code receiver or a code sender only, or to communicate separately with a teleprinter transmitter over one two-wire line and a teleprinter receiver over another two-wire line.

Fig. 2 shows schematically an accounting system making use of such an arrangement. This system is a recording and calculating arrangement for use, for example, in banks. Operators ST1, ST2 are provided with teleprinters TP and dials DL and their equipments are connected to link circuits comprising backwardly and forwardly hunting switches SW1, SW2. Assuming that the teleprinters TP are equipped in known manner for converting the successive teleprinter direct current signals into voice frequency signals, or that simultaneous voice frequency signals are transmitted from the teleprinters, amplifier equipment OA for such signals is provided in each link circuit. The link circuits give access to recorders for teleprinter signals such as tape perforators or magnetic tape recorders MTR1–MTR3 for the different accounts. The operator will dial the serial number of an account for which a transaction is to be recorded and will obtain connection to the required recorder to which details of the transaction will be sent by teleprinter control of OA.

Alternatively, different portions of a length of tape could be allotted to different accounts, drive arrangements controlled by a serial number received being arranged to set the tape to the required portion of the tape on which a particular transaction is to be recorded.

The link circuits are each provided with a third switch SW3 to the banks of which are connected code signal receivers PHR arranged as shown in Fig. 1 and associated with a calculator or calculators CAL. The calculators are also associated with code senders PHT arranged as shown in Fig. 1 by which the results from the calculator equipment are transmitted to a tabulator TB of teleprinter type.

The day's transactions are recorded as explained above. At some convenient hour, for instance, after business hours, the magnetic tapes are returned to their starting positions and are then connected in turn via SW2, SW3 to the calculators to which the recorded transactions are sent. The calculator works out the balance.

Figs. 3 and 4 show the circuit and some mechanical details of a recording arrangement in which messages transmitted from a teleprinter may be recorded upon a magnetic tape and reproduced later to control another teleprinter or equivalent device.

This recording principle is based upon the well-known principle of recording voice frequency signals on a magnetic tape, which passes at constant speed in front of a fixed electro-magnet having its poles staggered in the direction of motion of the tape. To record signals, the electro-magnet is placed in series with the source of the variable current to be recorded, and the variations in the flux created by the electro-magnet produce corresponding variations in the magnetisation of the tape passing in front of the magnet. Due to the remanent magnetisation, the variations impressed upon the tape will affect any other electro-magnet if the magnetised tape is passed in front of it with the same speed as was used for recording the signals. The current induced in the winding of this electro-magnet will then be similar to the current used for the impression of the tape.

*Practical application*

In a practical case, as shown in Fig. 4 the tape consists of a half-hard steel wire 0.25 mm. in diameter, wound around a metallic cylinder 1 mounted on shaft 2 which is driven by a constant speed motor (not shown) through a suitable clutch mechanism 7. The linear speed of the wire is 30 cm. per second so that a teleprinter code combination lasting for 140 milliseconds will be recorded on 4.2 cm. of the tape. The total length of the latter being 220 meters, approximately 5200 characters or signs may be recorded on the same tape.

The recording, reproduction and erasion of signals are effected by means of two electro-magnets, one of which is used for recording and reproduction, and the second for erasion.

For recording, the tape 3 (Fig. 3), advancing from A to B, first passes in front of the erasing magnet EM, which produces a constant magnetisation along the tape. When now the tape passes in front of the recording magnet RM, this constant magnetisation is modulated by the varying effect of magnet RM, so that finally the tape will pass on with a remanent magnetisation resulting from the two consecutive magnetisations.

A direct current of 0.010 amp., applied to the magnet EM is suitable for the constant magnetisation of the tape. An alternating current at 0.002 volt, 500 cycles, is suitable for the recording magnet RM.

For reproduction of the signals, the tape passes with the same speed, and in the same direction as for recording, in front of the same two electro-magnets EM and RM, but in this case, the winding of EM remains open. The winding of magnet RM creates a 500 cycle alternating current corresponding to the recorded signal. This current, having a voltage of approximately two millivolts, is amplified and, after being rectified, controls a transmitting relay.

The wire 3 is passed over a plurality of pulleys 6 which are supported upon a plate 6a which plate is perpendicular to the axis of the cylinder 1 and which plate is adapted to be traversed parallel to the axis of said cylinder by the lead screw 5. Also mounted on a plate are the erasing magnets and recording magnets. The lead screw 5 is adapted to be coupled to the clutch 7 through the disc 8. The clutch 7 is engaged to start the recorder into rotation on the receipt of a start impulse and disengaged on receipt of a stop impulse in known manner.

The above arrangements for a magnetic tape recorder are described by way of example only. The recorder used in the arrangement of Fig. 2 could be of any type from which the signals are adapted to be reproduced.

Having now particularly described and ascertained the nature of our said invention and in what manner the same is to be performed we declare that what we claim is:

1. An electric calculator system comprising an electric calculator, an operator's position adapted to transmit a telegraph code, code discriminating means disposed between said calculator and said operator's position, said means coupled to said calculator, a two-wire line coupling said operator's position to said means, said means including a plurality of interconnected circuits arranged to pass to said calculator only such combinations in a telegraph code transmitted by said operator's position, as have a significance to said calculator, and means connected to said operator's position to prevent the passage of signals to said calculator upon the receipt of a letter shift signal combination, whereby a mathematical problem may be passed to said calculator for solution.

2. An electric calculator system as claimed in claim 1, wherein said operator's position comprises a plurality of teleprinter stations, switching means for interconnecting any one of said stations with said code discriminating means, said switching means controlled by a calling signal from any one of said stations.

3. Electric calculator equipment as claimed in claim 1, in which said code discriminating means is adapted to transform signals in a printing telegraph code using a combination of different conditions in successive time intervals to represent characters.

4. Electric calculator equipment as claimed in claim 1, wherein said code discriminating means prevents any signals being passed to said calculator until a distinctive signal has been received.

5. Electric calculator equipment as claimed in claim 4, in which said distinctive signal comprises the figure shift signal followed by an additional signal.

6. Electric calculator equipment as claimed in claim 5, in which said additional signal is effective to allow signals to be passed to said calculator even although other signal combinations have been received previously but after the figure shift signal.

7. Electric calculator equipment as claimed in claim 6, in which, after said distinctive signal has been received only such signal combinations in said printing telegraph code as have a significance to said calculator are passed to said calculator.

8. An electrical accounting system comprising an electrical calculator, means for transmitting electric signals in a printing telegraph code, means for recording selected problems upon separate recording means in a printing telegraph code, means for coupling said recording means to said transmitting means, means for subsequently reproducing the selected problems recorded on said recording means, means for connecting said reproducing means to said calculator, code translating means disposed between said reproducing means and said calculator, a two wire line coupling said transmitting means with said recording means, means for causing said calculator to perform a calculation in response to a predetermined signal transmitted thereto and means for recording the result of calculations performed by said calculator.

9. An electrical accounting system as claimed in claim 8, wherein said means for connecting said reproducing means to said calculator comprise automatic selecting means adapted to connect said separate recording means to said calculator in turn, whereby the recorded problems stored in respective of said recording means are successively calculated by said calculator and the results thereof are separately sent to said result recording means.

10. Circuit arrangement as claimed in claim 8, in which said means for recording selected problems comprises means for recording signals upon a flexible paramagnetic material as variations in the magnetisation thereof.

11. An electrical accounting system as claimed in claim 8 wherein said means for recording the result of calculations performed by said calculator comprises a teleprinter and means for connecting said calculator to said teleprinter whereby telegraph code signals representing said results of calculations performed by said calculator are transmitted to said teleprinter.

12. Circuit arrangement as claimed in claim 8, in which said means for recording selected problems comprises a flexible paramagnetic material adapted to have variations in the magnetization thereof and an erasing electro-magnet to the windings of which is applied a constant direct current, a recording electro-magnet to the windings of which said transmitted signals are applied and means for traversing said material, first past the poles of the erasing magnet and then past the poles of the recording electro-magnet.

13. Circuit arrangement as claimed in claim 2, wherein said means for recording selected problems comprises a magnetic wire wound around a helical groove in a supporting cylinder, said wire passing also over pulleys supported upon a plate perpendicular to the axis of said cylinder and traversed parallel to said axis, the said electro-magnets being supported on said plate.

14. An electric calculator system comprising an electric calculator responsive to a first electric signal code representing a mathematical problem to be solved, code translating means, teleprinter means adapted to transmit and receive printing telegraph code signals, a two wire line, said teleprinter means adapted to be selectively connected to said translating means via said line under control of said teleprinter means, said translating means adapted to be selectively connected to said calculator under control of said teleprinter means, said translating means comprising control means responsive to a particular printing telegraph signal code combination transmitted by said teleprinter means, means under control of said last-named means to seize said calculator, said control means responsive to particular signal code combinations transmitted by said calculator upon seizure thereof, means for repeating said signal code combinations to said teleprinter means, additional means for repeating printing telegraph code signals to said calculator representing a mathematical problem, and further means for repeating signal code combinations from said calculator to said teleprinter means representing the solution of a problem.

WILLIAM HATTON.
LESLIE BAINES HAIGH.
LADISLAS KOZMA.

References Cited in the file of this patent

UNITED STATES PATENTS

| Number | Name | Date |
|---|---|---|
| 2,172,754 | Lasker et al. | Sept. 12, 1939 |
| 2,224,244 | Hicks | Dec. 10, 1940 |
| 2,279,353 | Van Duuren | Apr. 14, 1942 |
| 2,283,999 | Kozma et al. | May 26, 1942 |
| 2,340,809 | Hatton et al. | Feb. 1, 1944 |
| 2,355,281 | Dickinson | Aug. 8, 1944 |
| 2,434,681 | Williams | Jan. 20, 1948 |

FOREIGN PATENTS

| Number | Country | Date |
|---|---|---|
| 331,182 | Great Britain | June 24, 1930 |